(12) United States Patent
Yoneda et al.

(10) Patent No.: US 7,988,945 B2
(45) Date of Patent: Aug. 2, 2011

(54) NIOBIUM MONOXIDE

(75) Inventors: Yoshihiro Yoneda, Ageo (JP); Shuji Ogura, Ageo (JP); Isamu Yashima, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 195 days.

(21) Appl. No.: 12/303,127

(22) PCT Filed: Jun. 26, 2007

(86) PCT No.: PCT/JP2007/062774
§ 371 (c)(1),
(2), (4) Date: Dec. 8, 2008

(87) PCT Pub. No.: WO2008/001754
PCT Pub. Date: Jan. 3, 2008

(65) Prior Publication Data
US 2010/0267545 A1  Oct. 21, 2010

(30) Foreign Application Priority Data

Jun. 26, 2006  (JP) ................ P2006-175411

(51) Int. Cl.
*C01G 33/00* (2006.01)
(52) U.S. Cl. .................... 423/594.17; 423/62
(58) Field of Classification Search .......... 423/594.17, 423/62
See application file for complete search history.

(56) References Cited

U.S. PATENT DOCUMENTS

| 6,391,275 B1 * | 5/2002 | Fife .............. 423/594.8 |
| 6,934,146 B2 | 8/2005 | Omori et al. .......... 361/501 |
| 2007/0031324 A1 | 2/2007 | Yoneda et al. ......... 423/594.17 |

FOREIGN PATENT DOCUMENTS

| JP | 7-101726 | 4/1995 |
| JP | 2002-321917 | 11/2002 |
| JP | 2005-68507 | 3/2005 |
| JP | 2005-247601 | 9/2005 |
| JP | 2005-256175 | 9/2005 |
| WO | WO 02/093596 | 11/2002 |
| WO | WO2005/028370 | 3/2005 |
| WO | WO 2006/075510 | 7/2006 |

OTHER PUBLICATIONS

H.R. Khan et al., "Magnetic and Superconducting Properties of Niobium Oxides." Materials Research Bulletin, 1974, Vo. 9, No. 9, pp. 1129-1135, Table 1.

* cited by examiner

*Primary Examiner* — Steven Bos
(74) *Attorney, Agent, or Firm* — Roberts & Roberts, LLP

(57) ABSTRACT

An object of the present invention is to provide a niobium monoxide able to realize large capacitance in a miniature sized capacitor. The invention relates to a niobium monoxide having a porous structure comprising particles, characterized in that the niobium monoxide has a full-width at half maximum of an X-ray diffraction peak corresponding to a (111) plane or an X-ray diffraction peak corresponding to a (200) plane of 0.21° to 1.0°. The niobium monoxide has a large specific surface area and porosity, and is especially suitable for use in a capacitor.

20 Claims, 2 Drawing Sheets

NIOBIUM MONOXIDE

TECHNICAL FIELD

The present invention relates to a niobium oxide having a porous structure, especially to a niobium monoxide suitable for use in a capacitor.

BACKGROUND ART

A niobium oxide has been broadly used as a material for electronic parts, such as a frequency filter and a capacitor, a target of sputtering, and the like. Especially, when a niobium oxide is used as a dielectric substance for a capacitor, owing to its resistance to damages by load voltage and flame retardancy, a capacitor with high reliability can be produced. Furthermore, owing to its lower density compared with metallic niobium or tantalum of the same volume, downweighting and downsizing of the capacitor are possible, and further owing to a high dielectric constant a capacitor with a high capacitance can be produced. For use in a capacitor, especially niobium monoxide among niobium oxides has attracted the attention.

Methods for producing a niobium oxide by which the particle size or the specific surface area can be regulated have been known as the prior art (Patent Document 1, Patent Document 2). Further a niobium monoxide probably suitable for use in a capacitor has been proposed (Patent Document 3).

Patent Document 1: Japanese Patent Application Laid-Open No. Hei 07-101726

Patent Document 2: Japanese Patent Application Laid-Open No. 2002-321917

Patent Document 3: WO2002/093596

According to Patent Document 1 and Patent Document 2, a niobium oxide with a large specific surface area can be obtained, and in Patent Document 3 a niobium monoxide having a tap density, a specific surface area and the like suitable for use in a capacitor, with a small particle size and high purity is disclosed. In case a capacitor is produced with a niobium monoxide having a high specific surface area, not only the capacitance can be increased, but also impregnation of an electrolytic solution can be advantageously improved.

Due to rapid advancement of miniaturization and slimming down of electronic devices in the recent years, a niobium capacitor being small in size but having large capacitance is now strongly demanded. However, the niobium monoxide, whose specific surface area, tap density, particle size, and the like are specified by the prior art, cannot fully meet the requirements of the market as a raw material for a niobium capacitor. A development of a more suitable material for a capacitor has been desired.

Under such circumstances, an object of the present invention is to provide a niobium monoxide realizing large capacitance with a miniature sized capacitor.

DISCLOSURE OF THE INVENTION

Toward the object, the present inventors have intensively studied about a niobium monoxide suitable for use in a capacitor focusing on the structure of the niobium monoxide. As a result the present inventors have discovered that using a niobium monoxide having a porous structure comprising particles, which has appropriate crystallinity, as a raw material for a capacitor, a high performance capacitor can be produced, thereby completing the present invention.

The present invention relates to a niobium monoxide having a porous structure comprising particles, wherein the niobium monoxide has a full-width at half maximum of an X-ray diffraction peak corresponding to a (111) plane or an X-ray diffraction peak corresponding to a (200) plane of 0.21° to 1.0°. The present inventors have found that the full-width at half maximum falls within the range when a plurality of primary particles of the niobium monoxide are bonded together through constricted parts called "necks" forming a 3D-networked porous structure. Such a niobium monoxide has large specific surface area and porosity (described hereinbelow) and is a suitable raw material for use in the capacitor. The niobium monoxide of the present invention refers to $NbO_X$, wherein X is a value of 0.95 to 1.05.

Thereby, in case the full-width at half maximum is below 0.21°, there is a tendency that the crystallite diameter of the niobium monoxide becomes too large and the porous structure is not well formed. In case the full-width at half maximum is beyond 1.0°, there is a tendency that the crystallite diameter becomes too small and the necks are not well formed. The full-width at half maximum is preferably in the range of 0.26° to 0.50°, and within such range the porosity of the niobium monoxide becomes suitable for the use in a capacitor. In this case, in a capacitor production process, an anode material of $MnO_2$ can be easily impregnated and the formability of the capacitor tends to be improved. The (111) plane or the (200) plane of the niobium monoxide constitutes the main peak in X-ray diffractometry, and the (111) plane peak appears at an angle 2θ of 37.0°, and the (200) plane peak appears at 43.0° (see JCPDS (Joint Committee on Powder Diffraction Standards) card).

The full-width at half maximum is based on the full-width at half maximum ($β_{1/2}$) described in FIG. 6 of JIS K 0131-1996 (General rules for X-ray diffractometric analysis). Although the full-width at half maximum is expressed in the JIS (Paragraph 12: Measurements of Crystallite Size and Inhomogeneous Strain) by the unit of "rad", the same is expressed herein by "°". The X-ray diffractometry is carried out in the present invention by analyzing the diffraction X-ray peaks obtained by irradiating the CuKα line on a sample, without separating the peaks by the $CuKα_1$ line and the peaks by the $CuKα_2$ line, rather with those combined together.

Furthermore, the present invention relates to a niobium monoxide, wherein the niobium monoxide has, according to the afore-described X-ray diffractometry, a ratio (B/A) of an X-ray diffraction peak intensity (B) corresponding to the (111) plane to an X-ray diffraction peak intensity (A) corresponding to the (200) plane of 0.80 to 1.15. In case the peak intensity ratio B/A falls within the range, some distortion of the structure of the niobium monoxide takes place, which presumably contributes to increase of the capacitance of a produced capacitor.

The niobium monoxide of the present invention has preferably a specific surface area (a BET value) of 2.0 $m^2/g$ to 50.0 $m^2/g$. Since the niobium monoxide of the present invention has a porous structure comprising particles, the sufficient specific surface area can be assured. With the large specific surface area a capacitor with a high capacitance can be produced.

In case the specific surface area is below 2.0 $m^2/g$, by producing a capacitor sufficient capacitance may not be obtained. In case 50.0 $m^2/g$ is exceeded, although the capacitance is increased, there is an increased risk of burning in the air. The specific surface area of 3.0 $m^2/g$ or higher is more preferable, because such a high capacitance capacitor as $10^5$ CV/g or higher can be produced.

Further, the niobium monoxide of the present invention has preferably a porosity of 40% or higher, representing a ratio of void volume to bulk volume as measured by mercury penetration porosimetry. Since the niobium monoxide of the present invention has a porous structure comprising particles, the porosity can be high and an anode material of $MnO_2$ can be easily impregnated in a capacitor production process. In case the porosity is below 40%, the impregnation work tends to become difficult. In case the porosity exceeds the upper limit of 76%, the niobium monoxide becomes brittle and forming to a pre-determined shape becomes difficult and a capacitor with a sufficient density tends to become difficult to be attained in a capacitor production process. The measurement of the mercury penetration porosimetry was conducted according to JIS R 1655 (Test method for pore size distribution of formed fine ceramics by mercury penetration porosimetry) and the porosity was calculated according to (Mercury penetrated volume)/(Bulk volume of a sample).

The niobium monoxide of the present invention is an $NbO_X$, in which X is 0.95 to 1.05, thereby the oxygen content according to a thermal analysis becomes 14.0% to 15.3% by weight. Below 14.0% by weight, some metallic niobium may be contained and a produced capacitor may have higher risk of burning. Beyond 15.3% by weight, some niobium dioxide, which is an insulator, may be contained, and the electrical properties tend to be deteriorated. Thereby the oxygen content of a sample was determined by measuring the weight change on heating in the air using a differential thermal—thermogravimetric analyzer.

The niobium monoxide of the present invention can be obtained by reducing a niobium oxide having a higher oxidation number by a dry process using a reducing agent containing carbon. More specifically, a niobium oxide having a higher oxidation number and a reducing agent containing carbon are preferably heated to the temperature range of 1,000° C. to 1,800° C., and kept under an environmental pressure of 100 Pa or less. In case niobium pentoxide is used as the niobium oxide having a higher oxidation number, it is preferable to conduct a stepwise reduction treatment to obtain a niobium monoxide, comprising the first dry reduction of the niobium pentoxide to a niobium dioxide, and the second dry reduction of the niobium dioxide to the niobium monoxide. Thereby examples of a niobium oxide having a higher oxidation number include niobium pentoxide, niobium dioxide, $Nb_{16.8}O_{42}$, $Nb_{12}O_{29}$, $NbO_{1.64}$, and $Nb_4O_5$. A reducing agent containing carbon contains not only carbon but also one or more of carbon monoxide, a metal carbide, and a hydrocarbon such as methane, ethane and propane.

BEST MODE FOR CARRYING OUT THE INVENTION

Figure 1:
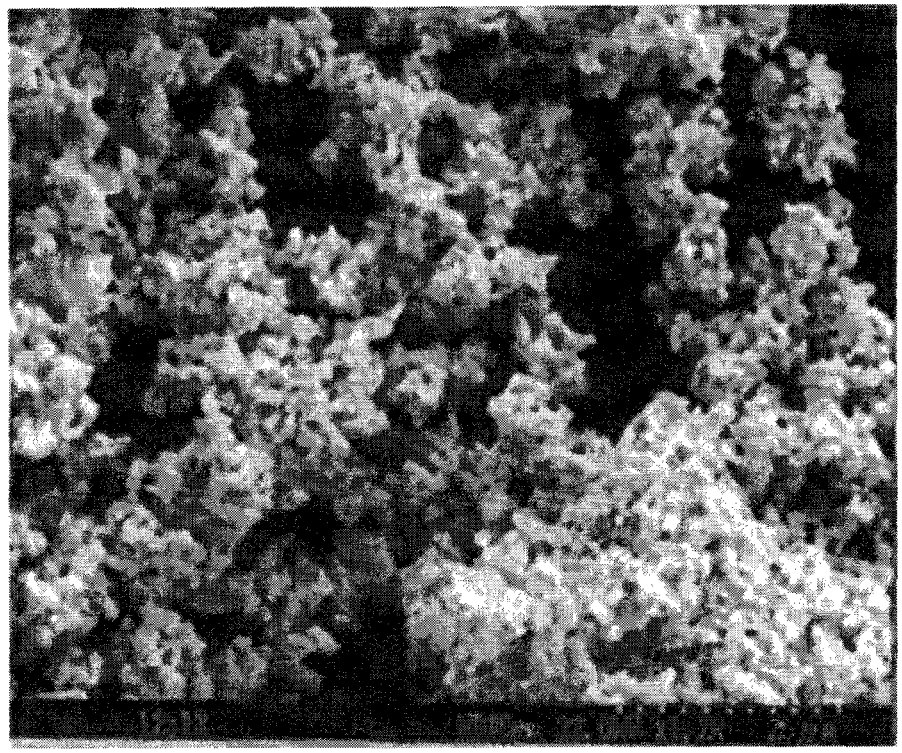
FIG. 1 is an SEM picture of the niobium monoxide of Example 2-1 (1,200×)

The most preferable embodiment of the present invention will be described below.

Example 1

In Example 1 niobium pentoxide ($Nb_2O_5$) was reduced to generate niobium dioxide ($NbO_2$) by a dry process in a hydrogen atmosphere, and then the latter was further reduced by a niobium carbide (NbC) to obtain niobium monoxide (NbO), about which various measurements were carried out. Such various measurement methods and the results are described hereinbelow.

As a raw material 1.0 kg of niobium pentoxide was treated for reduction in a tubular oven in a hydrogen atmosphere at 1,100° C. for 4 hours to obtain 0.89 kg of niobium dioxide ($NbO_2$). Then 0.35 kg of the $NbO_2$ and 0.15 kg of niobium carbide were dry-mixed and charged into a carbon crucible and heat-treated in a vacuum oven. Thereby the temperature in the vacuum oven was increased at a rate of 20 to 70° C./min, the pressure reduction was started at 1,500° C., and the reduction treatment was conducted at 1,500° C. under 10 Pa for 90 min. Similar experiments were repeated seven times as Examples 1-1 to 1-7.

Example 2

In Example 2, niobium pentoxide was reduced in a hydrogen atmosphere to generate niobium dioxide, which was then reduced with carbon, and then further reduced in a hydrogen atmosphere to obtain niobium monoxide. Various measurements were conducted for the niobium monoxide.

As a raw material 1.0 kg of niobium pentoxide was treated for reduction in a tubular oven in a hydrogen atmosphere at 1,000° C. for 4 hours to obtain 0.91 kg of niobium dioxide. Then 0.46 kg of the $NbO_2$ and 0.04 kg of carbon from the market were dry-mixed and charged into a carbon crucible and heat-treated in a vacuum oven. Thereby the temperature in the vacuum oven was increased at a rate of 20 to 70° C./min, pressure reduction was started at 1,400° C., and the reduction treatment was conducted at 1,500° C. under 10 Pa for 90 min. Then 0.1 kg of the obtained sample was reduced in the tubular oven in a hydrogen atmosphere at 1,400° C. for 4 hours to obtain niobium monoxide. Similar experiments were repeated twice as Examples 2-1 to 2-2.

Example 3

In Example 3, niobium pentoxide was reduced with carbon to generate niobium dioxide, which was then reduced with carbon, and then further reduced in a hydrogen atmosphere to obtain niobium monoxide. Various measurements were conducted for the niobium monoxide.

As a raw material 0.96 kg of niobium pentoxide and 0.04 kg of commercially available carbon were dry-mixed and charged into a carbon crucible and heat-treated in a vacuum oven. Thereby the temperature in the vacuum oven was increased at a rate of 20 to 70° C./min, pressure reduction was started at 1,400° C., and the reduction treatment was conducted at 1,400° C. under 10 Pa for 90 min to obtain 0.87 kg of niobium dioxide. Then 0.46 kg of the $NbO_2$ and 0.04 kg of carbon from the market were dry-mixed and charged into a carbon crucible and heat-treated in a vacuum oven. Thereby the temperature in the vacuum oven was increased at a rate of 20 to 70° C./min, pressure reduction was started at 1,600° C., and the reduction treatment was conducted at 1,500° C. under 10 Pa for 10 min. Then 0.1 kg of the obtained sample was reduced in the tubular oven in a hydrogen atmosphere at 1,400° C. for 4 hours to obtain niobium monoxide. Similar experiments were repeated 4 times as Examples 3-1 to 3-4.

Example 4

In Example 4, the niobium monoxide obtained according to the above processing steps was crushed to samples, for which various measurements were conducted.

As a crusher a bead mill (Ready Mill, manufactured by Aimex Co. Ltd.) with 0.2 mm-diameter zirconia balls as crushing media (crushing media made of zirconium oxide) was used. Into a crushing vessel of the bead mill (volume 0.4 L), 0.1 L of zirconia balls were charged and then a slurry of 40% by weight concentration composed of 63 g of the niobium monoxide of Example 2-1 and 92 g of pure water was charged. Then the thus prepared bead mill was run at a rotation speed of 2,600 rpm to carry out wet crushing for 2.5 hours. The crushed sample was recovered, for which the average particle size and the BET specific surface area were measured. As a result, the crushed niobium monoxide had the average particle size $D_{50}$ of 0.48 μm and the specific surface area of 10.7 $m^2/g$, and contained 6,800 ppm of zirconium oxide ($ZrO_2$).

Figure 4:
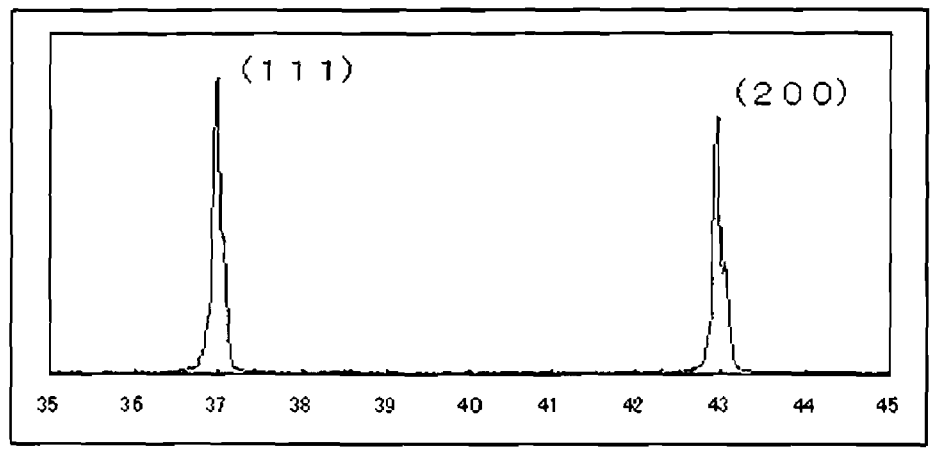
FIG. 4 is a chart showing the peak intensities in X-ray diffractometry in Example 2-1.
Figure 5:
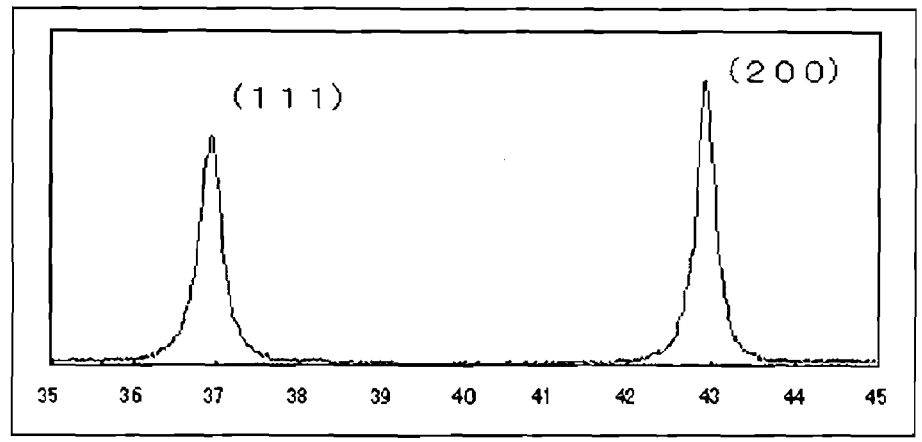
FIG. 5 is a chart showing the peak intensities in the X-ray diffractometry in Example 4.

X-ray diffractometry: A powder of a niobium oxide was analyzed with an X-ray diffractometer (MXP18, manufactured by MAC Science Corp.). Thereby a Cu target was used and the intensity of the X-ray diffraction was measured using the Cu—$K\alpha_1$ line, setting other measurement conditions: an X-ray tube voltage at 40 kV, an X-ray tube current at 150 mA, a scanning angle range, $2\theta=10°$ to $90°$, a sampling width at $0.02°$ and a scanning rate at $4.0°/min$. Among the appeared peaks from the above measurements, a peak full-width at half maximum was determined from the most intensive peak (see FIG. 6 of JIS K 0131-1996 (General rules for X-ray diffractometric analysis)). Furthermore, a peak intensity ratio (B/A) of the intensity of a peak (B) corresponding to the (111) plane to the intensity of a peak (A) corresponding to the location corresponding to the (200) plane was determined. The full-widths at half maximum and the peak intensity ratios are shown in Table 1 and the diffraction charts are shown in FIGS. 3 to 5.

TABLE 1

| | Full-width at half maximum (°) | | Peak intensity |
|---|---|---|---|
| | (111) plane | (200) plane | ratio (B/A) |
| Example 1-1 | 0.28 | 0.26 | 0.97 |
| Example 1-2 | 0.26 | 0.26 | 0.94 |
| Example 1-3 | 0.26 | 0.26 | 0.98 |
| Example 1-4 | 0.26 | 0.26 | 1.00 |
| Example 1-5 | 0.26 | 0.26 | 0.97 |
| Example 1-6 | 0.26 | 0.26 | 1.02 |
| Example 1-7 | 0.26 | 0.26 | 1.06 |
| Example 2-1 | 0.26 | 0.26 | 1.15 |
| Example 2-2 | 0.26 | 0.26 | 1.14 |
| Example 3-1 | 0.26 | 0.26 | 1.05 |
| Example 3-2 | 0.26 | 0.26 | 1.02 |
| Example 3-3 | 0.26 | 0.26 | 1.05 |
| Example 3-4 | 0.26 | 0.26 | 1.09 |
| Example 4 | 0.32 | 0.30 | 0.81 |

Figure 3:
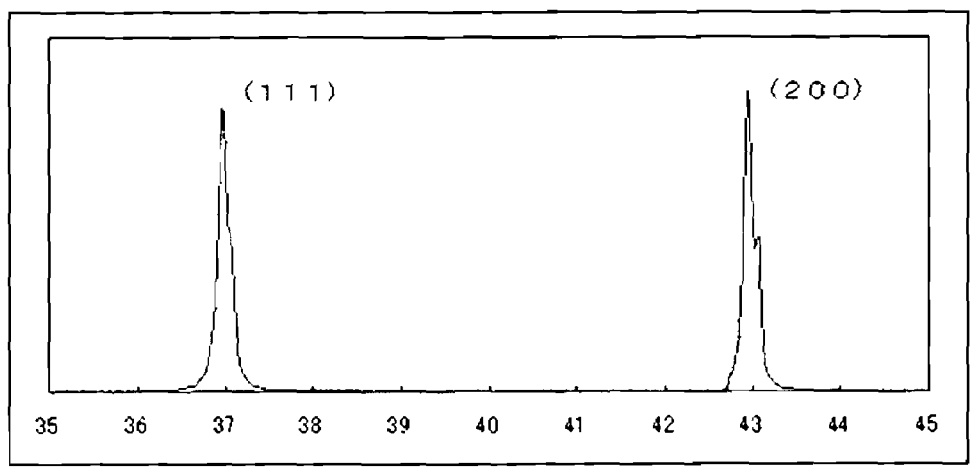
FIG. 3 is a chart showing the peak intensities in the X-ray diffractometry in Example 1-2.

By the X-ray diffractometry of the niobium monoxide of Example 1, the appearance of sharp peaks of the (111) plane and the (200) plane was observed as shown in FIG. 3. With respect to the niobium monoxides of Example 2 and Example 3, two sharp peaks were observed as in FIG. 4 similarly as in Example 1. As obvious from FIG. 5, the niobium monoxide of Example 4, which was subjected to the crushing treatment, gave slightly broader peaks.

As further obvious from Table 1, with respect to the niobium monoxides of Examples 1 to 4, the full-widths at half maximum were in the range of $0.21°$ to $1.0°$, and the peak intensity ratios (B/A) were in the range of 0.80 to 1.15.

Certain consideration was carried out about the results of the Examples and the data of the JCPDS cards. From the data of the JCPDS cards about $NbO_{0.7}$ and $NbO_{1.1}$, the respective peak intensity ratios (B/A) are calculated to give B/A=1.37 in case of $NbO_{0.7}$ and B/A=0.95 in case of $NbO_{1.1}$. From these data a calibration line showing the relationship between the X value of $NbO_X$ and B/A is formulated to (B/A)=−1.05X+2.105. Using this calibration line, the X values of $NbO_X$ were determined from the B/A values of the respective Examples to give X values in the range of 0.91 to 1.23. On the other hand, from the results of differential thermal—thermogravimetric analysis (as described below) for the niobium monoxides of the Examples, the obtained X values of $NbO_X$ were in the range of 0.95 to 1.05, which are different from the X values obtained from the JCPDS card data. This difference is presumably attributable to a distortion occurred in the structure of the niobium monoxide of the Examples, which gives diffraction peaks having a peak intensity ratio different from the intensity ratio calculated from the JCPDS card data.

Figure 2:
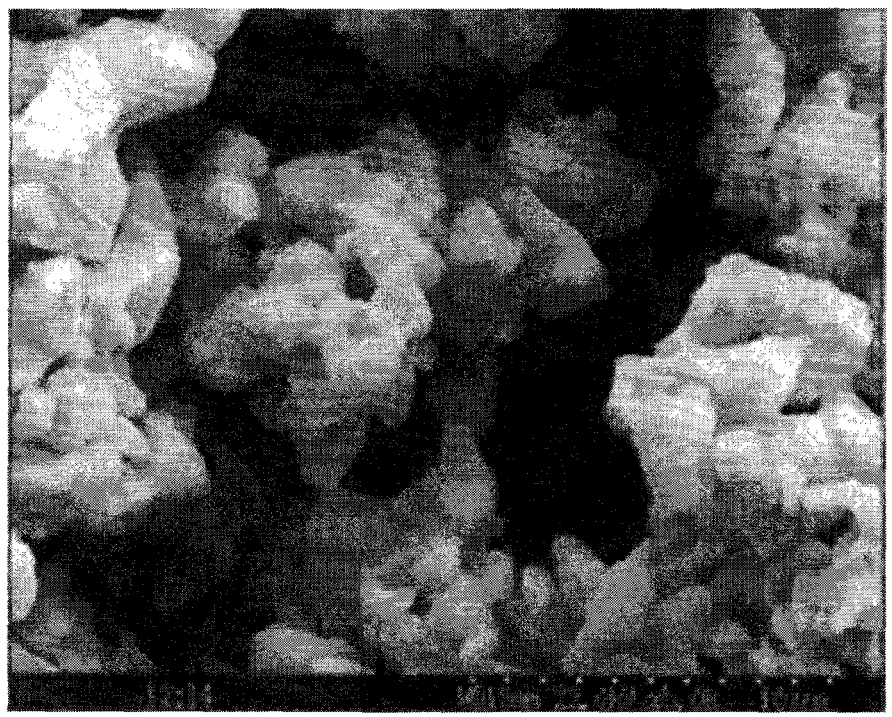
FIG. 2 is an SEM picture of the niobium monoxide of Example 2-1 (5,000×)

The niobium monoxide of Examples 2-1 is observed as white parts on the pictures of FIG. 1 and FIG. 2. The niobium monoxide is an aggregate of primary particles with a size of 1 to 3 μm. A part of the surface of a primary particle is bonded with another primary particle through a neck part thereof forming a 3D-networked secondary particle, which obviously forms as a whole a porous structure with many voids.

Specific surface area measurement (BET): The BET specific surface area was measured for the niobium oxide obtained in the respective Examples and a Comparative Example by a BET specific surface measuring apparatus (Flowsorb II 2300 of Micromeritics Instrument Corp. manufactured by Shimadzu Corporation) using a nitrogen—helium mixture gas containing about 30% by volume of nitrogen as an adsorbate gas and about 70% by volume of helium as a carrier gas according to 6.2 Flow method (3.5) One-point method of JIS R 1626 (Measuring methods for the specific surface area of fine ceramic powders by gas adsorption using the BET method). The results are shown in Table 2.

Porosity: Using a pore size distribution measuring mercury penetration porosimeter (AutoPore IV manufactured by Micromeritics Instrument Corp.), a penetrated volume of mercury into 0.5 g of a sample under the pressure of 0.7 kPa to 400 MPa was measured to calculate a porosity according to (Mercury penetrated volume)/(Bulk volume of a sample). The results are shown in Table 2.

Oxygen content: (TG-DTA): Using a differential thermal—thermogravimetric analyzer (manufactured by Seiko Instruments Inc.), 4 mg of a sample was heated in the air at a heating rate of $3°$ C./min, and the oxygen content was calculated from the weight change. The results are shown in Table 2.

TABLE 2

| | Specific surface area ($m^2/g$) | Porosity (% by volume) | Oxygen content (% by weight) |
|---|---|---|---|
| Example 1-1 | 10.8 | 58.7 | 15.1 |
| Example 1-2 | 11.3 | 58.1 | 15.0 |
| Example 1-3 | 11.0 | 61.9 | 14.9 |
| Example 1-4 | 11.2 | 55.4 | 15.3 |
| Example 1-5 | 10.4 | 56.2 | 15.0 |
| Example 1-6 | 11.1 | 58.3 | 15.2 |
| Example 1-7 | 10.5 | 56.1 | 14.6 |
| Example 2-1 | 10.5 | 65.9 | 14.6 |
| Example 2-2 | 10.1 | 63.4 | 14.6 |
| Example 3-1 | 6.9 | 63.8 | 14.7 |
| Example 3-2 | 7.3 | 59.4 | 15.1 |
| Example 3-3 | 7.8 | 57.1 | 14.7 |
| Example 3-4 | 7.8 | 53.2 | 14.4 |
| Example 4 | 10.7 | 42.3 | 15.3 |

Obvious from Table 2 regarding the niobium monoxide of Examples 1 to 4, the specific surface area is in the range of 2.0 m$^2$/g to 50.0 m$^2$/g, the porosity is 40% or higher, and the oxygen content is in the range of 14.0% to 15.3% by weight. From the oxygen content, the X value of NbO$_X$ of the Examples is known to be from 0.95 to 1.05.

INDUSTRIAL APPLICABILITY

As described above, the niobium monoxide of the present invention has a porous structure comprising particles with appropriate crystallinity. Since the specific surface area and the porosity are large, the niobium monoxide is especially suitable for use in a capacitor.

The invention claimed is:

1. A niobium monoxide having a porous structure comprising particles, wherein the niobium monoxide has a full-width at half maximum of an X-ray diffraction peak corresponding to a (111) plane or an X-ray diffraction peak corresponding to a (200) plane of 0.21° to 1.0°; and wherein the niobium monoxide has, according to X-ray diffractometry, a ratio (B/A) of an X-ray diffraction peak intensity (B) corresponding to a (111) plane, to an X-ray diffraction peak intensity (A) corresponding to a (200) plane, of 0.94 to 1.15.

2. A niobium monoxide having a porous structure comprising particles, wherein the niobium monoxide has, according to X-ray diffractometry, a ratio (B/A) of an X-ray diffraction peak intensity (B) corresponding to a (111) plane, to an X-ray diffraction peak intensity (A) corresponding to a (200) plane, of 0.94 to 1.15.

3. The niobium monoxide claimed in claim 1 wherein the niobium monoxide has a specific surface area BET value of 2.0 m$^2$/g to 50.0 m$^2$/g.

4. The niobium monoxide claimed in claim 1 wherein the niobium monoxide has a porosity of 53.2% or higher, representing a ratio of void volume to bulk volume as measured with mercury penetration porosimetry.

5. The niobium monoxide claimed in claim 1 wherein the niobium monoxide has an oxygen content according to a thermal analysis of 14.0% to 15.3% by weight.

6. The niobium monoxide claimed in claim 2 wherein the niobium monoxide has a specific surface area BET value of 2.0 m$^2$/g to 50.0 m$^2$/g.

7. The niobium monoxide claimed in claim 2 wherein the niobium monoxide has a porosity of 53.2% or higher, representing a ratio of void volume to bulk volume as measured with mercury penetration porosimetry.

8. The niobium claimed in claim 3 wherein the niobium monoxide has a porosity of 53.2% or higher, representing a ratio of void volume to bulk volume as measured with mercury penetration porosimetry.

9. The niobium monoxide claimed in claim 6 wherein the niobium monoxide has a porosity of 53.2% or higher, representing a ratio of void volume to bulk volume as measured with mercury penetration porosimetry.

10. The niobium monoxide claimed in claim 2 wherein the niobium monoxide has an oxygen content according to a thermal analysis of 14.0% to 15.3% by weight.

11. The niobium monoxide claimed in claim 3 wherein the niobium monoxide has an oxygen content according to a thermal analysis of 14.0% to 15.3% by weight.

12. The niobium monoxide claimed in claim 6 wherein the niobium monoxide has an oxygen content according to a thermal analysis of 14.0% to 15.3% by weight.

13. The niobium monoxide claimed in claim 7 wherein the niobium monoxide has an oxygen content according to a thermal analysis of 14.0% to 15.3% by weight.

14. The niobium monoxide claimed in claim 8 wherein the niobium monoxide has an oxygen content according to a thermal analysis of 14.0% to 15.3% by weight.

15. The niobium monoxide claimed in claim 9 wherein the niobium monoxide has an oxygen content according to a thermal analysis of 14.0% to 15.3% by weight.

16. The niobium monoxide claimed in claim 3, wherein the niobium monoxide has an oxygen content according to a thermal analysis of 14.0% to 15.3% by weight, and wherein the niobium monoxide has a porosity of 53.2% or higher, representing a ratio of void volume to bulk volume as measured with mercury penetration porosimetry.

17. A process for producing the niobium monoxide according to claim 1, the process comprising dry reducing a niobium oxide having a higher oxidation number by heating with a reducing agent containing carbon at a temperature of 1,000° C. to 1,800° C. under an environmental pressure of 100 Pa or less, until niobium monoxide is produced having a porous structure comprising particles, wherein the niobium monoxide has a full-width at half maximum of an X-ray diffraction peak corresponding to a (111) plane or an X-ray diffraction peak corresponding to a (200) plane of 0.21° to 1.0°; and wherein the niobium monoxide has, according to X-ray diffractometry, a ratio (B/A) of an X-ray diffraction peak intensity (B) corresponding to a (111) plane, to an X-ray diffraction peak intensity (A) corresponding to a (200) plane, of 0.94 to 1.15.

18. The process of claim 17 wherein the niobium oxide comprises at least one of Nb$_{16.8}$O$_{42}$, Nb$_{12}$O$_{29}$, NbO$_{1.64}$, and Nb$_4$O$_5$.

19. The process of claim 17 wherein the reducing agent comprises one or more of carbon monoxide, a metal carbide, and a hydrocarbon.

20. A process for producing the niobium monoxide according to claim 2, the process comprising dry reducing a niobium oxide having a higher oxidation number by heating with a reducing agent containing carbon at a temperature of 1,000° C. to 1,800° C. under an environmental pressure of 100 Pa or less, until niobium monoxide is produced having a porous structure comprising particles, wherein the niobium monoxide has, according to X-ray diffractometry, a ratio (B/A) of an X-ray diffraction peak intensity (B) corresponding to a (111) plane, to an X-ray diffraction peak intensity (A) corresponding to a (200) plane; of 0.94 to 1.15.

* * * * *